(No Model.)
O. A. WHEELER.
WHEELED TOBOGGAN.
No. 430,098. Patented June 10, 1890.
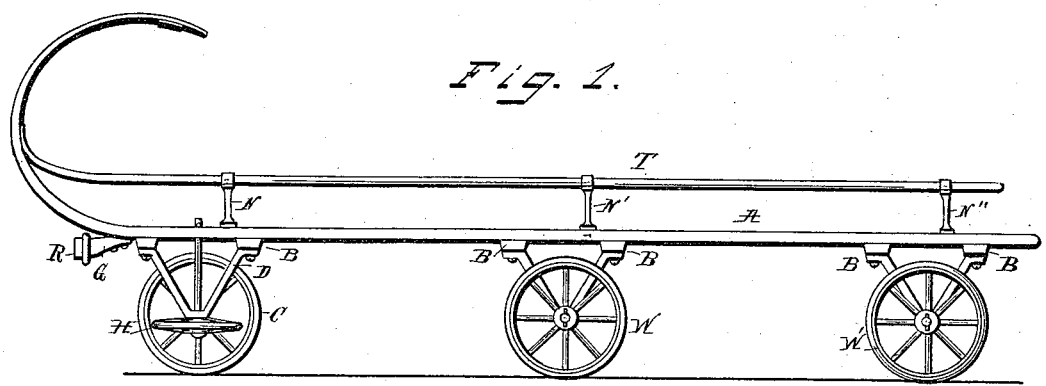
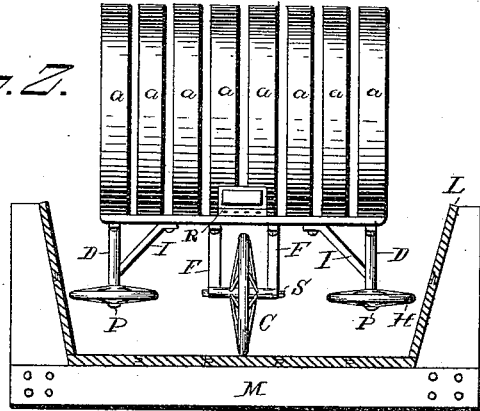
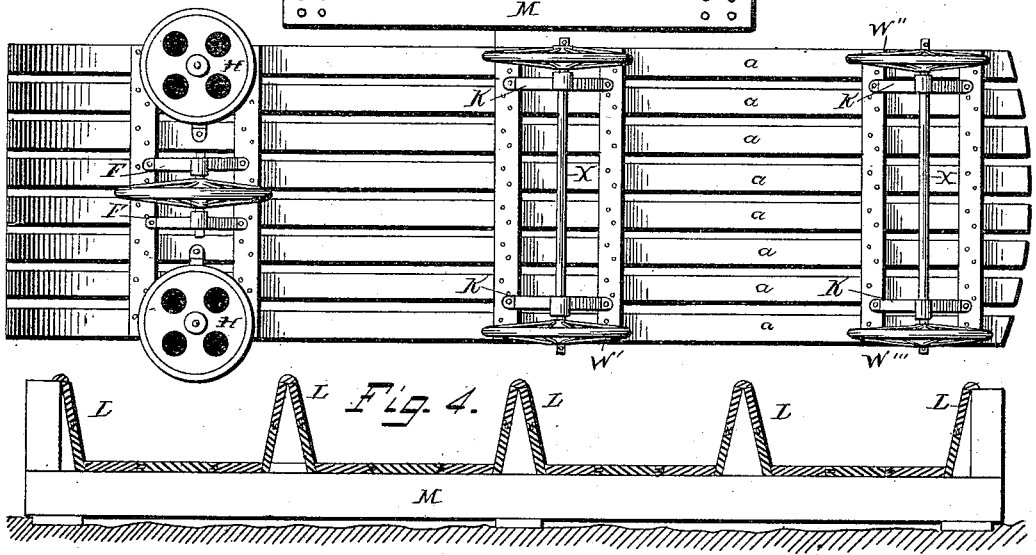
Witnesses.
M. A. Barnes.
Van Buren Hillyard.
Inventor.
Orrin A. Wheeler
By R. S. & A. P. Lacey
Attys.
THE NORRIS PETERS CO., PHOTO-LITHO., WASHINGTON, D. C.

UNITED STATES PATENT OFFICE.

ORRIN A. WHEELER, OF SPRINGFIELD, MISSOURI.

WHEELED TOBOGGAN.

SPECIFICATION forming part of Letters Patent No. 430,098, dated June 10, 1890.

Application filed July 8, 1887. Renewed May 17, 1890. Serial No. 352,227. (No model.)

*To all whom it may concern:*

Be it known that I, ORRIN A. WHEELER, a citizen of the United States, residing at Springfield, in the county of Greene and State of Missouri, have invented certain new and useful Improvements in Wheeled Toboggans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in toboggans, the object of which is to provide a cheap, simple, and durable vehicle for riding down hill or inclined planes having a non-glacial surface—like that of wood, earth, stone, &c.—and to obviate nearly all friction and noise. These objects I attain by means of devices illustrated in the accompanying drawings, in which—

Figure 1 is a side view of a toboggan embodying my invention; Fig. 2, a front view of the same, showing a cross-section of the runway; Fig. 3, a bottom plan view, and Fig. 4 an end view, of a series of runways.

A is a toboggan constructed in the usual form, having the front end turned upwardly and composed of slats $a$, secured to cross-pieces B on the under side, which cross-pieces are spaced a proper distance apart to receive the brackets K, D, and F. A space may be left between each two of the slats and will make the vehicle lighter, more airy, and springy.

K K' K'' K''' are brackets that are secured by screws or bolts to cross-pieces B and connect the axles X X' to the main body. F F' are similar brackets for holding the pilot-wheel C between them, as shown in the drawings.

W, W', W'', W''', and C are wheels of any convenient size and having rubber tires secured to their outer rims by any method desired. These wheels carry the vehicle and its load, and the rubber tires lessen the noise and jar and give the sensation, as far as possible, experience by riding on snow and ice, so that the pastime of coasting may be enjoyed at all times of the year and in climates devoid of snow.

H H' are guard-wheels similar to the other wheel, but smaller, and secured to the front end of the vehicle by the perpendicular axles P and brackets D, strengthened by the lateral braces I. These wheels direct the vehicle or toboggan in transit by running against one or the other of the side rails L of the runway, which allows the vehicle to glide along smoothly without retarding its speed. The wheels H H' project beyond the plane of the sides of the vehicle and are the only parts that come in contact with the rails L. The hand-rails T of the toboggan are fastened at their front ends to the front portion of the vehicle and are supported by the standards or pillars N.

R is a rubber bumper held to the front end of the vehicle by the casting G. This is to protect the vehicles when they bump together in stopping and starting.

In Fig. 2 is shown a cross-section of the runway or slide for this toboggan. M is the cross-beams on which is laid the floor Y. L L' are side or guard rails set at a slight angle with the floor, so as to clear the wheel-hubs, and against which the guard-wheels H H' run when the toboggan is nearer one side than the other of the runway, which can be built on a natural hill or be built up artificially to any desired incline and have as many runs as desired. I thus produce a simple device that can be used all the year round and in all climates, regardless of snow and ice, for the pleasurable enjoyment of coasting without subjecting one's self to the bitter cold of winter weather.

This toboggan is automatically guided without the rider dragging his feet, which retards the motion and endangers the limbs, and entirely prevents one vehicle from colliding with another.

When it is desired to run on a circular runway, the axles are set so that the wheels on the outside will be farther apart than those on the inner side, or the side next to the center of the circular runway, and a line parallel with each axle would meet in the center of a circle equal in circumference to the circular runway.

Fig. 4 is an end view of a slide or runway showing four runs. This would allow four toboggans to run side by side.

The pilot-wheel is located intermediate and in line with the guide-wheels, which impinging against the side rails of the runway prevent the careening or toppling over of the vehicle.

Having thus described my invention, what I claim, and desire to secure by Letters Patent, is—

1. The herein shown and described toboggan, composed of slats spaced apart and held together by cross-beams, the hand-rails joined to the front portion of the vehicle and supported by pillars, the carrying-wheel, the pilot-wheel centrally disposed and supporting the front end of the toboggan, and the guide-wheels on each side of the pilot-wheel arranged in a horizontal plane or at right angles to the plane of the pilot-wheel, substantially as specified.

2. The combination, with a toboggan, of a centrally-disposed pilot-wheel supporting the front end of the toboggan, and the guide-wheels arranged on each side of and at right angles to the pilot-wheel, substantially as and for the purpose specified.

3. The herein shown and described runway for toboggans, composed of a floor and flaring or outwardly-inclined side walls, substantially as specified.

4. A runway for toboggans, composed of a series of runways arranged side by side and separated from each other by a wall common to each two, substantially as shown.

In testimony whereof I affix my signature in presence of two witnesses.

ORRIN A. WHEELER.

Witnesses:
J. S. BURNS,
GEO. D. EMERY.